(12) United States Patent
White et al.

(10) Patent No.: US 11,872,756 B2
(45) Date of Patent: *Jan. 16, 2024

(54) THREE-DIMENSIONAL PRINTING SYSTEM

(71) Applicant: HEWLETT-PACKARD DEVELOPMENT COMPANY, L.P., Spring, TX (US)

(72) Inventors: Scott White, Sant Cugat del Valles (ES); Jordi Sanroma Garrit, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,478

(22) Filed: Apr. 21, 2022

(65) Prior Publication Data
US 2022/0242042 A1  Aug. 4, 2022

Related U.S. Application Data

(63) Continuation of application No. 16/097,703, filed as application No. PCT/US2016/044694 on Jul. 29, 2016, now Pat. No. 11,331,853.

(51) Int. Cl.
*B29C 64/259* (2017.01)
*B33Y 40/00* (2020.01)
(Continued)

(52) U.S. Cl.
CPC ......... *B29C 64/259* (2017.08); *B29C 64/153* (2017.08); *B29C 64/165* (2017.08);
(Continued)

(58) Field of Classification Search
None
See application file for complete search history.

(56) References Cited

U.S. PATENT DOCUMENTS 5,121,329 A   6/1992  Crump
6,019,046 A   2/2000  Rodi
(Continued)

FOREIGN PATENT DOCUMENTS

CA    2958945 A1   3/2016
CN    103764379   4/2014
(Continued)

OTHER PUBLICATIONS

International Search Report and Written Opinion for International Application No. PCT/US2016/044694 dated May 11, 2017, 7 pages.
(Continued)

*Primary Examiner* — Robert J Grun
(74) *Attorney, Agent, or Firm* — Shook, Hardy & Bacon L.L.P.

(57) ABSTRACT

Certain examples described herein relate to a removable unit for a three dimensional printing system. The removable unit comprises at least one compartment to store build material for a three-dimensional print job, a coupling to engage with a printer device of the three-dimensional printing system, and a memory. The memory is configured to store instructions for the three-dimensional print job for the printer device, and the instructions are readable from the memory by the printer device when the removable unit is engaged with the printer device.

16 Claims, 8 Drawing Sheets

(51) Int. Cl.

| | | |
|---|---|---|
| *B29C 64/153* | (2017.01) | |
| *B29C 64/165* | (2017.01) | |
| *B33Y 30/00* | (2015.01) | |
| *B33Y 50/02* | (2015.01) | |
| *B29C 64/307* | (2017.01) | |
| *B29C 64/393* | (2017.01) | |
| *B33Y 40/20* | (2020.01) | |
| *B33Y 40/10* | (2020.01) | |

(52) U.S. Cl.
CPC .......... *B29C 64/307* (2017.08); *B29C 64/393* (2017.08); *B33Y 30/00* (2014.12); *B33Y 40/10* (2020.01); *B33Y 40/20* (2020.01); *B33Y 50/02* (2014.12)

(56) References Cited

U.S. PATENT DOCUMENTS

| | | | |
|---|---|---|---|
| 9,233,504 B2 | 1/2016 | Douglas et al. | |
| 9,292,230 B2 | 3/2016 | Scheller | |
| 11,331,853 B2 * | 5/2022 | White | B29C 64/307 |
| 2007/0087071 A1 | 4/2007 | Devos et al. | |
| 2010/0043698 A1 | 2/2010 | Bolt | |
| 2011/0289791 A1 | 12/2011 | Menchik et al. | |
| 2015/0331402 A1 | 11/2015 | Lin et al. | |

FOREIGN PATENT DOCUMENTS

| | | |
|---|---|---|
| CN | 104760279 | 7/2015 |
| CN | 105209240 | 12/2015 |
| CN | 105658356 | 6/2016 |
| CN | 205291593 | 6/2016 |
| DE | 102014007408 | 11/2015 |
| EP | 2298539 | 3/2011 |
| JP | H08295004 A | 11/1996 |
| KR | 1020170097167 | 11/2019 |
| WO | WO-2006020685 | 2/2006 |
| WO | WO-2008103985 | 8/2008 |
| WO | WO-2009085110 A1 | 7/2009 |
| WO | WO-2015027464 A1 | 3/2015 |
| WO | WO-2015176709 | 11/2015 |
| WO | WO-2016116139 A1 | 7/2016 |

OTHER PUBLICATIONS

The Printed World, Feb. 10, 2011, < http://www.economist.com/node/18114221 >.

* cited by examiner

THREE-DIMENSIONAL PRINTING SYSTEM

CROSS REFERENCE TO RELATED APPLICATIONS

This is a continuation of U.S. application Ser. No. 16/097,703 filed Oct. 30, 2018 which is a national stage of international application no. PCT/US2016/044694 filed Jul. 29, 2016, each incorporated herein by reference in its entirety.

BACKGROUND

Three-dimensional (3D) printing is a common term used to describe additive manufacturing methods and systems. In this field, 3D printers build three-dimensional (3D) objects from selective addition of build material. In an example system, build material is formed in layers in a working area. Chemical agents, referred to as "printing agents", are then selectively deposited onto each layer within the working area. In one case, the printing agents may comprise a fusing agent and a detailing agent. In this case, the fusing agent is selectively applied to a layer in areas where particles of the build material are to fuse together, and the detailing agent is selectively applied where the fusing action is to be reduced or amplified. For example, a detailing agent may be applied to reduce fusing at an object boundary to produce a part with sharp and smooth edges. Following the application of printing agents, energy is applied to the layer. This fuses particles of build material. The process is then repeated for another layer, such that objects are built from a series of cross-sections. In certain examples, a 3D object is designed within 3D modelling software installed on a design workstation. The 3D modelling software may then submit a print job to a 3D printer to initiate the build process.

BRIEF DESCRIPTION OF THE DRAWINGS

Examples of the disclosure will be described with reference to the accompanying drawings, in which.

DETAILED DESCRIPTION

Certain examples described herein provide adapted components for, and methods of instructing, an additive manufacturing system. In certain cases, a removable unit for the additive manufacturing system is used to provide print job instructions for at least the printer device, wherein the removable unit also provides build material to construct an object (or objects) defined within the instructions. This may be compared to comparative methods where print job instructions are provided directly to the printer device, e.g. where a print job is transmitted to the printer device following processing by a printer driver on a design workstation.

Figure 1A:
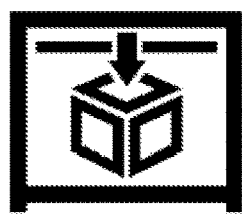
FIGS. 1a, 1b and 1c show schematic views of an example 3D print system.
Figure 1A:
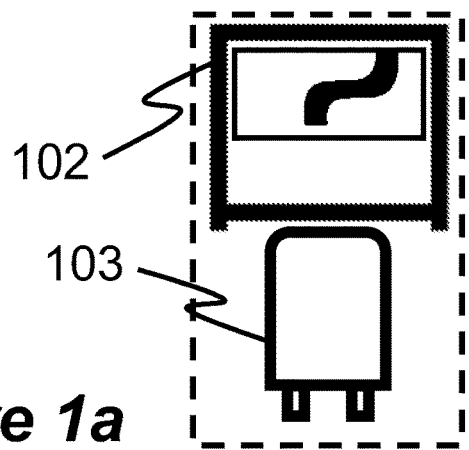
Figure 1B:
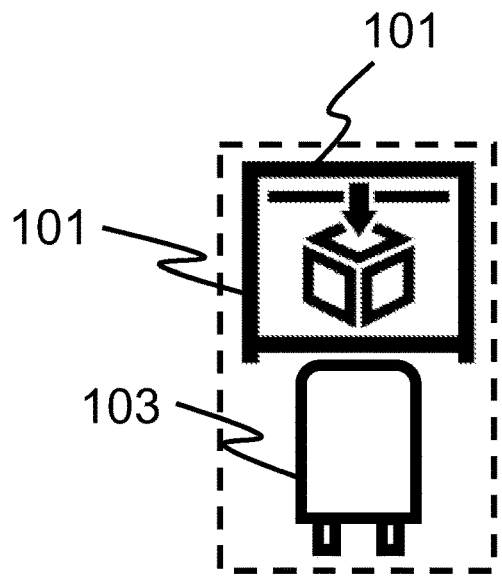
Figure 1C:
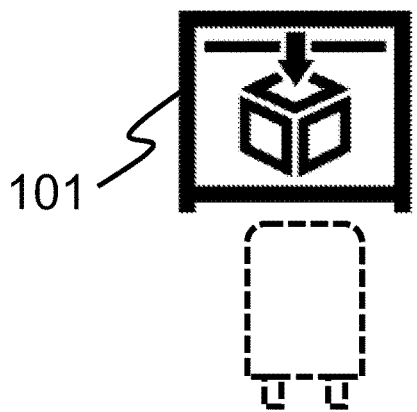
Figure 1C:
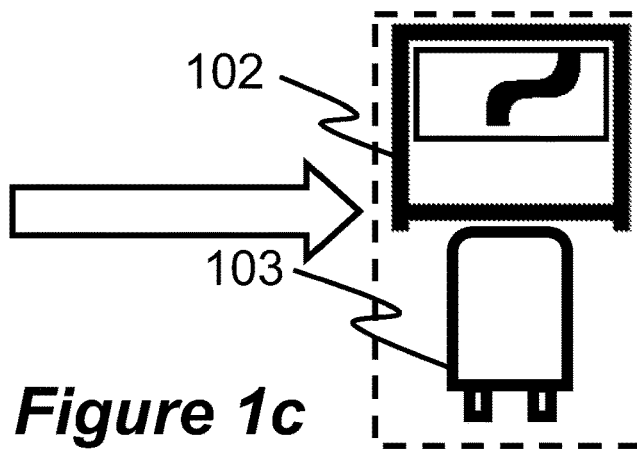

FIGS. 1a, 1b and 1c show a 3D print system 100 comprising three components: a printer device 101; a material processing station 102; and a removable unit 103.

The printer device 101 is configured to deposit printing agents onto successive layers of build material to construct at least one 3D object. In one example, the printer device 101 may comprise an inkjet-type deposit mechanism, such as a thermal or piezo printhead. The printing agents may comprise a fusing agent and a detailing agent. The printer device 101 may also comprise energy sources such as incandescent and/or infra-red lamps to apply energy to the layers of build material to enable fusing. The following disclosure may also be applied to other forms of powder bed additive manufacturing. The printer device 101 is configured to construct a 3D object based on instructions forming part of a print job. These print job instructions may control the movement and/or firing of a printing agent deposition mechanism, and/or to apply a fusing energy so as to fuse portions of build material that form part of an object's cross section.

The removable unit 103 comprises at least one compartment to store build material for a print job. As such the removable unit 103 may be referred to as a "build" unit. The build material may be supplied, in one example, in the form of a polymer powder. In some examples, the removable unit 103 may also be used to store fused and unfused build material during processing of a print job. The removable unit 103 is moveable and may be removably coupled to the printer device 101. In certain cases, the removable unit 103 may be mounted on castors. In some examples, the movement of the removable unit 103 may be wholly automated.

The material processing station 102 is arranged to perform material processing operations in relation to a print job. The material processing station 102 may have multiple functions. In one case, the material processing station 102 is arranged to load the removable unit 103 with build material to be used to construct a 3D object. In certain cases, e.g. in addition to, or instead of, loading the removable unit 103, the material processing station 102 is arranged to perform a number of post-processing operations. These may comprise: "un-caking" or "un-packing" the 3D object (e.g. removing un-fused build material that is still in a powder form); clean parts of the 3D object and/or removable unit 103; and/or reclaim leftover build material for recycling or disposal.

FIGS. 1a, 1b and 1c shows a number of phases wherein the printer device 101, the removable unit 103 and the material processing stations 102 are used together to manufacture a 3D object. In a first phase, and as shown in FIG. 1a, the removable unit 103 is engaged with the material processing station 102. The material processing station 102 is configured to prepare, e.g. mix, the build materials for 3D printing and load the removable unit 103 with these materials ready for printing. Mixing build materials may comprise reviewing print job data and loading different types, amounts and/or colours of polymer powder into the removable unit 103.

FIG. 1b shows the second phase, whereby after pre-processing and loading of the build material by the material processing station 102 into the removable unit 103, the removable unit 103 is disengaged from the material processing unit 102, and may be moved from the material processing station 102 and engaged with a printer device 101 for the next phase—additive manufacturing. If the removable unit 103 is mounted upon castors this may comprise wheeling the unit from the material processing station 102 to the printer device 101. In other cases, the removable unit 103 may be moved by hand (e.g. carried) and/or moved using an automated (e.g. robotic) processing line. Once the removable unit 103 is coupled with the printer device 101, build material is taken from the removable unit 103 and arranged in a series of layers within a working area (e.g. upon a build platform). The printer device 101 may deposit printing agents onto these layers of build material based on print job instructions. The printer device 101 may also apply fusing energy to solidify portions of the build material on which fusing agent was applied.

As shown in FIG. 1c, after the additive manufacturing of the 3D object has been completed, the removable unit 103 is disengaged from the printer device 101. It is then moved and re-engaged with the material processing station 102 for post-processing, such as "un-caking" the 3D object, cleaning parts, and reclaiming the leftover powder for recycling or disposal.

Figure 2:
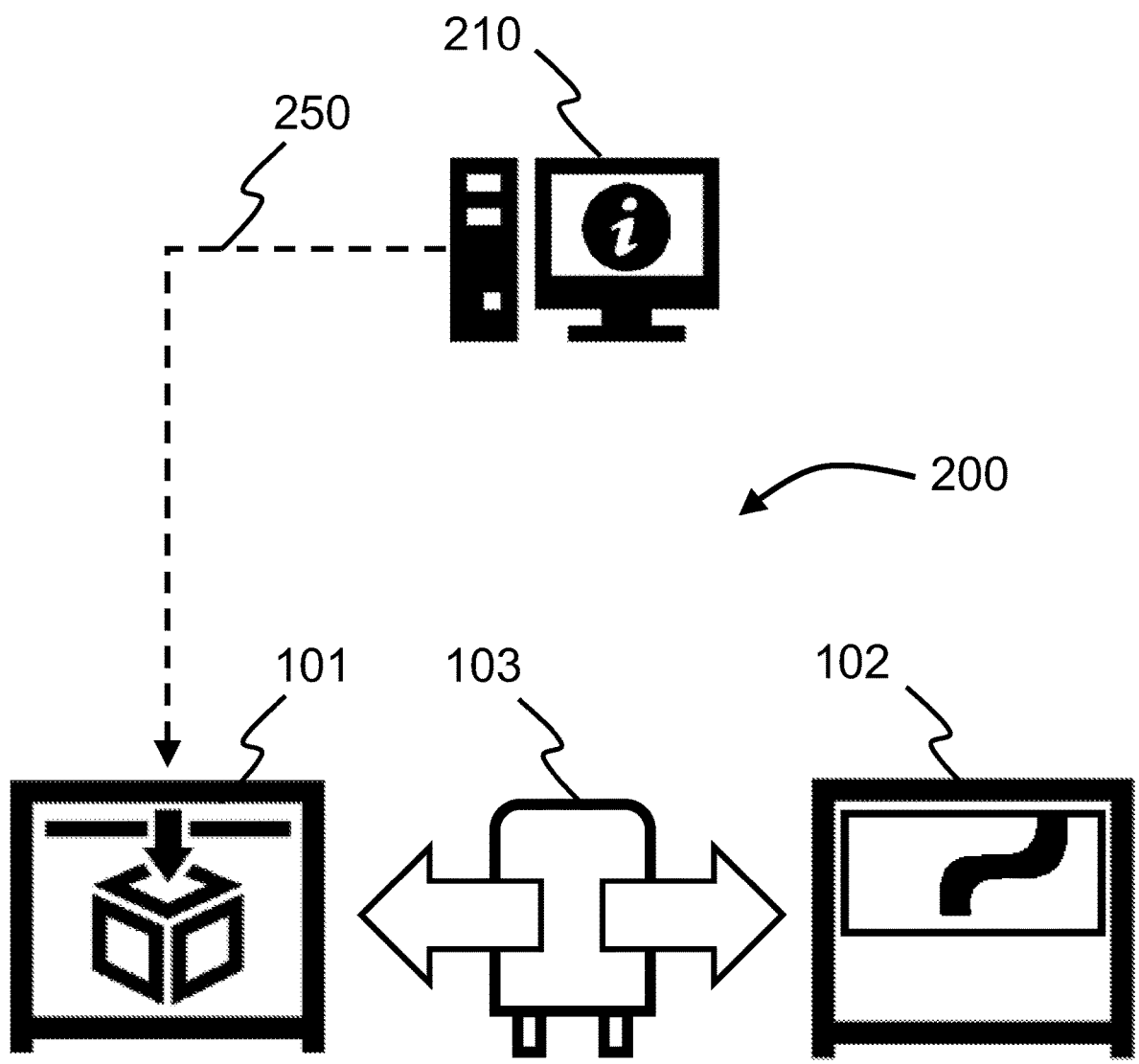
FIG. 2 shows a schematic view of a comparative example 3D print system and an instructing user terminal.

FIG. 2 shows a comparative 3D printing system 200 comprising a printer device 101, a material processing station 102, and a removable unit 103 (i.e. the components shown in FIGS. 1a to 1c). The removable unit 103 is moveable between both the printer device 101 and the material processing station 102. FIG. 2 also shows a user terminal 210 running a print application. The user terminal 210 may comprise a design workstation. In the example of FIG. 2, the user terminal 210 is connected to the 3D print system across a network connection 250. In other cases, the user terminal 10 may be directly coupled to the printer device 101, e.g. using a universal serial bus connection. A comparative process for 3D printing involves submitting instructions for printable content from the user terminal 210 to the printer device 101, e.g. over the network connection 250. For example, a user may load a 3D object as defined in a 3D model file (e.g. a STereoLithography '.STL' file) within a print application. The user may then submit the 3D object to be printed (e.g. by clicking a "print" button). Data defining the 3D object may then be processed by a 3D print driver into instructions for a 3D print job. Processing of data defining the 3D object may be performed by the user terminal 210 and/or the printer device 101. In this comparative process, the material processing station 102 and removable unit 103 are "dumb", i.e. they are not party to the information that is exchanged between the user terminal 210 and the printer device 101 and are un-connected/non-networked units.

Certain examples described herein provide an alternate process for instructing a 3D printing system that uses adapted components of the printing system. In this alternate process, print job instructions are communicated to a removable unit. When the removable unit is engaged with a printer device to supply build material, the print job instructions may also be communicated from the removable unit to the printer device. In certain cases, the print job instructions may be communicated directly to the removable unit. In other cases, the print job instructions may be first communicated to a material processing station and then transferred to the removable unit during pre-processing, i.e. when the removable unit is engaged with the material processing station. In certain examples, the material processing station may also receive the print job instructions from the removable unit, which may be used to control pre- and/or post-processing at the material processing station.

Figure 3A:
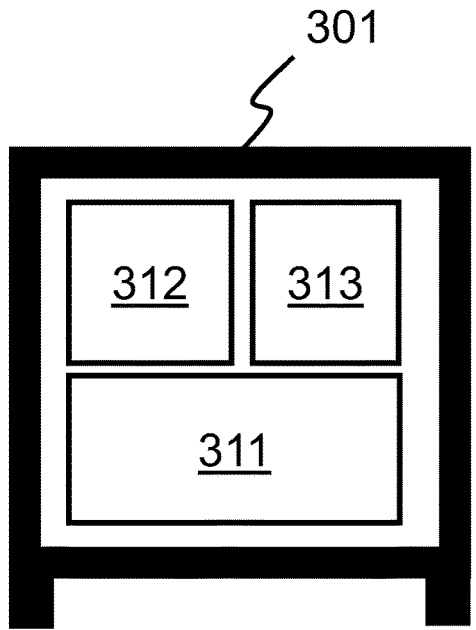
FIGS. 3a-3c show example components of a 3D print system.

FIG. 3a shows an example printer device 301. The printer device 301 is arranged to perform additive manufacturing to produce at least one 3D object. In this case, the printer device 301 comprises a coupling 311 to engage with a removable unit, a print controller 312 to use build material stored within an engaged removable unit to complete a three-dimensional print job, and a data transfer interface 313 to receive instructions for the three-dimensional print job from the engaged removable unit. The coupling 311 may comprise a mechanical coupling with at least two states: engaged and unengaged. The coupling 311 on the printer device 301 may be arranged so as to mate with a corresponding coupling on the removable unit. The data transfer interface 313 may comprise a wired and/or wireless interface. For example, the data transfer interface 313 may comprise a physical interface over which print job instructions are transferred as a series of electrical signals. In the case of a wireless interface, the data transfer interface 313 may comprise a Bluetooth®, Zigbee® or IEEE 802.11 interface.

Figure 3B:
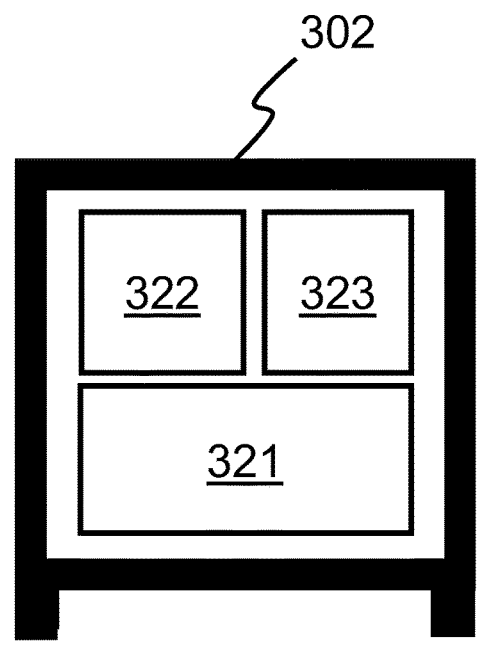

FIG. 3b shows an example material processing station 302. The material processing station 302 comprises a coupling 321 to engage with a removable unit of the three-dimensional print system, a material supply system 322 to load an engaged removable unit with build material for a three-dimensional print job, and a data transfer interface 323 to communicate instructions for the three-dimensional print job between an engaged removable unit and the material processing station 302. The coupling 321 may be arranged as discussed above with respect to the printer device 301. The coupling 321 may be the same as or may differ from the coupling 311 of the printer device 301. The data transfer interface 323 may comprise a wired and/or wireless interface as discussed above. It may be the same as or may differ from the data transfer interface 313 of the printer device 301. The material supply system 322 may comprise a vacuum system, or auger screw-type mechanism, arranged to extract build material from at least one build material supply containers and to deposit a predefined amount of build material into at least one compartment of the removable unit. The material supply system 322 may mix different types of build material, in controlled amounts, that are supplied from different build material supply containers. In certain cases the material supply system 322 may use recycled build material, e.g. build material that has been extracted during an "un-caking" process for a past 3D object.

Figure 3C:
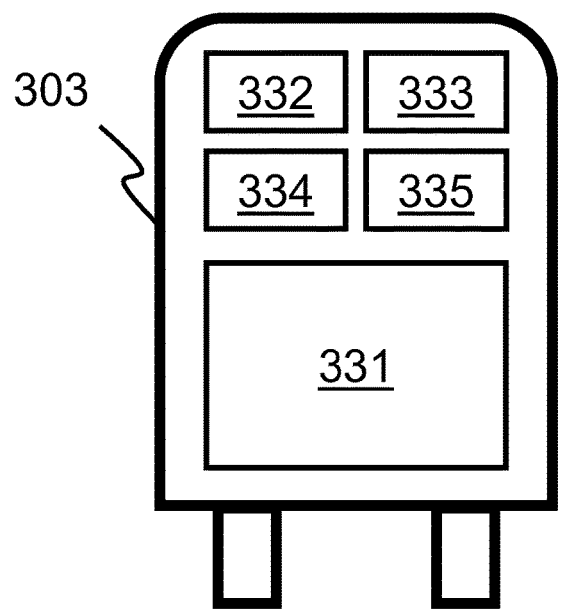

FIG. 3c shows an example removable unit 303 for a three-dimensional print system. The removable unit 303 comprises at least one compartment 331 to store build material for a three-dimensional print job. The compartment 331 may be lined, e.g. comprise a bag or box within a physical enclosure, or unlined, e.g. comprise the physical enclosure. If multiple types of build material are available, multiple compartments may be provided for each type. Alternatively, different mixes of build materials may be stored in different compartments. The removable unit 303 also comprises a coupling 332 to engage with the printer device 301 or the material processing station 302 of the three-dimensional print system. The coupling 332 may be a single mechanical coupling that is configured to mate with corresponding features on both the printer device 301 and the material processing station 302. Alternatively, the coupling 332 may comprise separate couplings for each of the printer device 301 and the material processing station 302. The coupling 332 may comprise a power coupling and/or an electronic coupling as well as a physical coupling.

The removable unit 303 also comprises a memory 333 for storing print job instructions. The removable unit may also optionally comprise a data transfer interface 334 and/or a controller 335 to receive and send print job instructions, and to store print job instructions in the memory 333. The print job instructions may comprise information for manufacturing a 3D print object, including (but not limited to): the amount and composition of print materials to be used; the dimensions of the 3D print object to be manufactured; the identity of components in a 3D printer system to be used (e.g. a particular printer device); and the movement and/or firing of a printing agent deposition mechanism so as to fuse portions of build material that form part of an object's cross section to create such an object. The print job instructions should be readable by each component in the 3D print system corresponding to the instruction. The memory 333 of the removable unit 303 is configured to receive and store instructions for the print job, and, when engaged with the printer device 301 (e.g. such as shown in FIG. 1b), the instructions may be read by the printer device, for example via the data transfer interface 334. In one example, the instructions are received and directed to the memory 333 by the controller 335 of the removable unit 303. The data transfer interface 334 may transmit print job instructions to or via the data transfer interface 313 of the printer device 301. In one case, the data transfer interface 334 may comprise a physical connector that mates with a physical connector forming part of the data transfer interface 313 of the printer device 301 such that print job instructions may be communicated from the memory 333 to the print controller 312 of the printer device 301. If the data transfer interfaces comprise wireless interfaces, then the print job instructions may be transmitted from the removable unit 303 over the air such that they are received by the data transfer interface 313 of the printer device 301, wherein the data transfer interface 313 then relays the instructions to the print controller 312. In one example, the data transfer is handled by the controller 335 of the removable unit 303.

Figure 4:
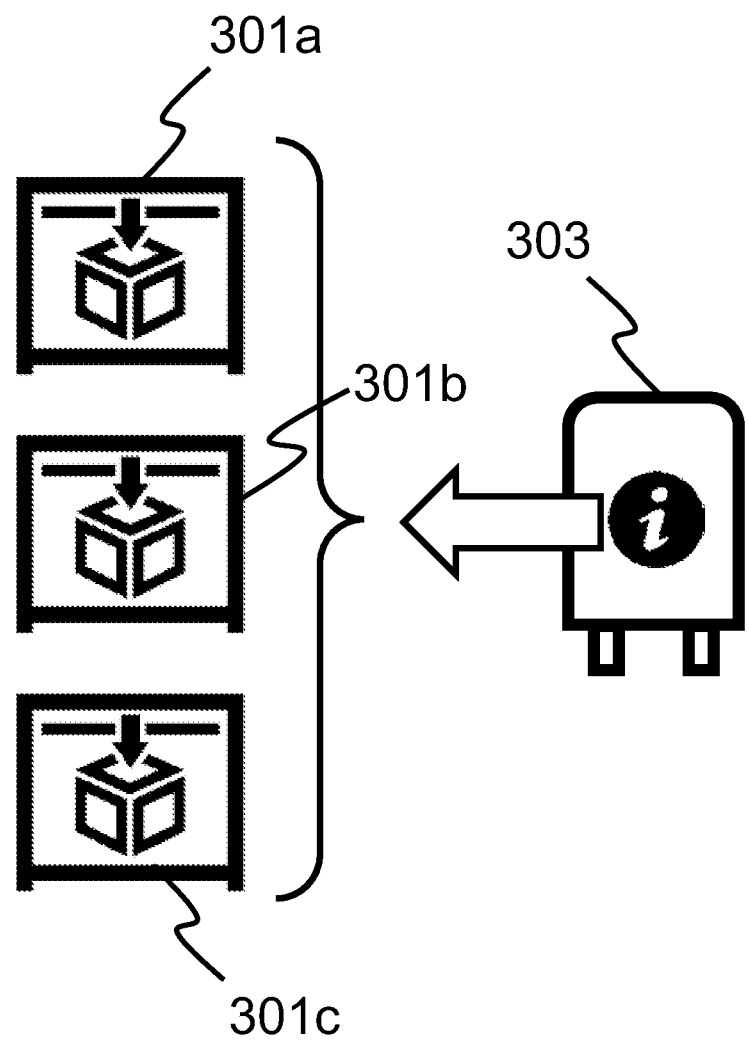
FIG. 4 shows a schematic view of an example 3D print system.

FIG. 4 shows a removable unit 303 and multiple printer devices 301a, 301b, 301c according to FIG. 3a and FIG. 3c. In the example shown, instead of providing the instructions directly to the printer device 301a, 301b, 301c as shown in FIG. 2, print job instructions for at least one 3D object to be manufactured are supplied to the removable unit 303. The removable unit 303 internally stores build materials for the at least one 3D object associated with the print job, e.g. in compartment 331. In FIG. 4, the removable unit 303 engages with a given printer device 301a, 301b, 301c of the 3D print system, and instructs the engaged printer device using the print job instructions from the removable unit 303. The engaged printer device (one of 301a, 301b, 301c) is then able to generate the at least one three-dimensional object with the build materials from the removable unit 303. In this manner, a printer device is selected for the print job by engaging the removable unit 303, wherein data for the print job is transferred from the removable unit 303. This allows greater flexibility when controlling a 3D print pipeline and enables more efficient use of available printer devices 301a, 301b, 301c.

For example, in a comparative case using a known method, a print application may distribute print jobs between printer devices 301. Each printer device 301 may thus have a print queue. If printer device 301a has a number of pending print jobs, any subsequently received print job received by it is added to the end of the queue. A user thus waits for the pending print jobs to complete. This is the case even if one of the other printer devices 301b or 301c is subsequently free. With the examples described above, the selection of a printer device 301 is made when a particular removable unit 303 storing the print job is engaged. This enables a choice of printer device 301 to be made. For example, if a user intends to print to printer device 301a but printer device 301a is busy and one of printer devices 301b or 301c is free, then a different selection of printer device may be made by engaging the removable unit 303 with one of printer devices 301b or 301c rather than printer device 301a. Following engagement, the instructions for the print job are transferred to one of printer devices 301b or 301c and the respective print controller 312 may use these instructions to initiate the print job. Similarly, if a user is waiting for printer device 301b to become free, but this device subsequently experiences a fault or error, a waiting removable unit 303 may simpler be moved to wait for another printer device (e.g. 301a or 301c) without reconfiguration of the print queues on the printer devices 301.

Figure 5:
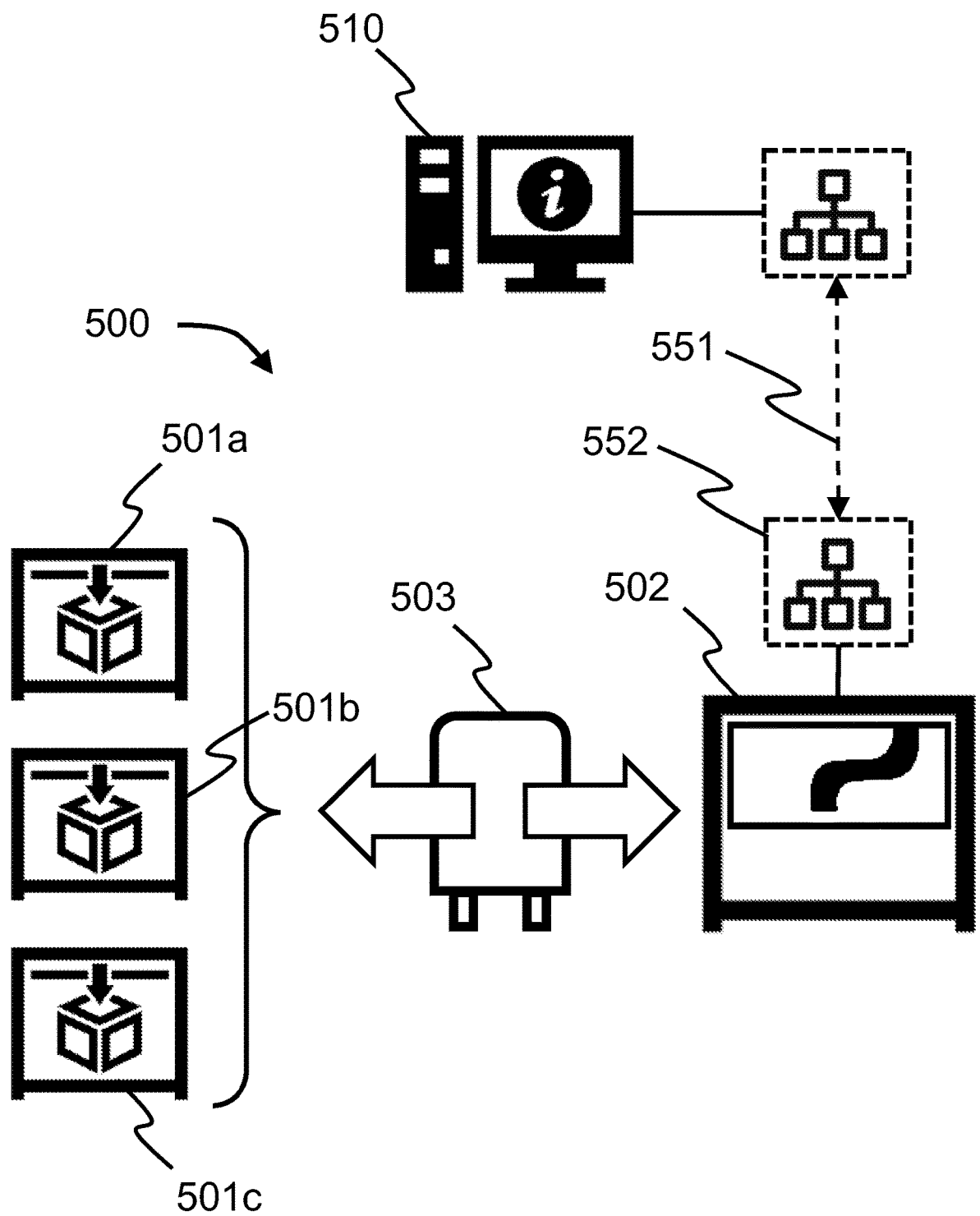
FIG. 5 shows an expanded example view of the 3D print system in FIG. 4 and an instructing user terminal.

FIG. 5 shows a 3D print system 500 comprising multiple printer devices 501a, 501b, 501c, a material processing station 502 and a removable unit 503 according to an example. The printer devices 501a, 501b, 501c, material processing station 502 and removable unit 503 may correspond to those shown in FIGS. 3a, 3b and 3c. In the example shown, instructions for a print job are provided to the 3D print system 500 from a computer device 510 running a print application. The print application may comprise a 3D modelling application and/or a print server. In one case, the print job may be received from a server computer device running a print server, wherein the print server receives the print job from the print application.

In the example of FIG. 5, the instructions are relayed to the 3D print system 500 via a network connection 551. The network connection 551 couples the computer device 510 and the material processing station 502. For example, the network connection 551 may form part of a local area network (LAN) or wide area network (WAN). It may comprise a wired or wireless connection (e.g. an Ethernet or WiFi connection). In the example shown, the material processing station 502 comprises a network interface 552 to receive the print job over the network connection 551. In certain cases, the material processing station 502 comprises a controller and memory. Following receipt of the print job at the network interface 552, the controller may be configured to store the print job within the memory until a removable unit 503 is engaged.

In use, the removable unit 503 is engaged with the material processing station 502 so as to perform at least one pre-processing operation before manufacturing a 3D object. This engagement may be enacted by mating the coupling 332 of the removable unit 503 with the coupling 321 of the material processing station. This may comprise coupling one or more connectors or fasteners and/or engaging a mechanical coupling mechanism to lock the removable unit 503 within the material processing station 502. In one case, the removable unit 503 comprises castors and is wheeled into position within the coupling of the material processing station 502.

In one case, the material processing station 502 may be arranged to prepare, mix and load the removable unit 503 with the build materials for to completing the 3D print job defined within the received print job. In one case, a controller of the material processing station 502 is configured to determine an amount of build material to supply to an engaged removable unit 503 based on instructions defining the print job, e.g. as stored in a memory of the material processing station 502. In this case, a material supply system of the material processing station 502 may be arranged to supply the determined amount of build material from at least one build material supply container to a compartment of the engaged removable unit 503. In an additional, or alternative, case, the aforementioned controller may be configured to determine a type of build material to supply to the engaged removable unit based on the instructions in the memory. In this case, the material supply system may be arranged to supply the determined type of build material from at least one build material supply container containing said type to a compartment of the engaged removable unit 503. In one case, the controller is configured to control mixing of build material of different types from a respective plurality of build material supply containers based on the instructions in the memory.

Following engagement, in the example of FIG. 5, the material processing station 502 is configured to communicate the received print job to the removable unit 503. This may comprise relaying instructions from data transfer interface 323 of the material processing station 502 to the data transfer interface 334 of the removable unit 503, and storing said instructions in the memory 333 of the removable unit 503. The transfer or relay of instructions may be performed by transmitting and receiving data over physical or wireless communications interfaces. The received print job may be transferred before, during or after the loading of build material into the removable unit. The transfer of the print job may be, in one case, initiated by a user interacting with a user interface of the material processing station 502 (e.g. a touchscreen interface). For example, once a removable unit 503 has been successfully engaged a user may be offered an option to download one or more print jobs that are stored in a memory of the material processing station 502 onto the removable unit 503. In one case, a user may be presented with one or more print jobs that are stored on a remote print server; upon selection by the user these print jobs may be transferred over the network connection 551 and then downloaded into the removable unit 503. In another case, a print job may be assigned to a particular removable unit 503 by the print application. In this case, an identifier of an engaged removable unit 503 may be read from the unit by the material processing station 502 and compared with data for at least one print job (stored either locally or remotely). If a match is found, then at least one print job associated with the identifier may be downloaded onto the removable unit 503.

Once the instructions have been transferred, and, for example, at least one compartment of the removable unit 503 has been loaded with suitable material for the 3D print job, said unit 503 may be disengaged from the material processing station 502. This may comprise releasing at least one mechanical coupling and/or disconnecting any electrical couplings. The removable unit 503 may then be moved, e.g. rolled or carried, to the printer devices 501.

In FIG. 5, the removable unit 503 is subsequently engaged with a printer device 501 of the 3D print system 500. Because the print instructions are stored in a memory 333 of the removable unit 503, the removable unit 503 may be engaged with any available printer device 501*a*, 501*b*, 501*c* in the 3D print system 500. Once the removable unit 503 in engaged with a given printer device 501*a*, 501*b*, 501*c* of the 3D print system 500, the instructions may be provided, via the data transfer interface 334 of the removable unit 503, to the data transfer interface 313 of the printer device 501. The print controller 312 of the printer device 501 uses the print job instructions and material from the removable unit 503 to carry out manufacturing of the 3D print object.

In a further example, once the printer device 501 has finished the 3D build phase, the removable unit 503 may be dis-engaged once more from the printer device 501. This may comprise releasing at least one mechanical coupling and/or disconnecting any electrical couplings. The removable unit 503 may then be moved, e.g. rolled or carried, back to the material processing station 502. Once the removable unit 503 has been re-engaged with the material processing station 502, post-processing steps may be carried out, for example such as: "un-caking" the 3D object (e.g. removing un-fused build material that is still in a powder form); cleaning parts of the 3D object and/or removable unit 503; and/or reclaim leftover build material for recycling or disposal.

Figure 6:
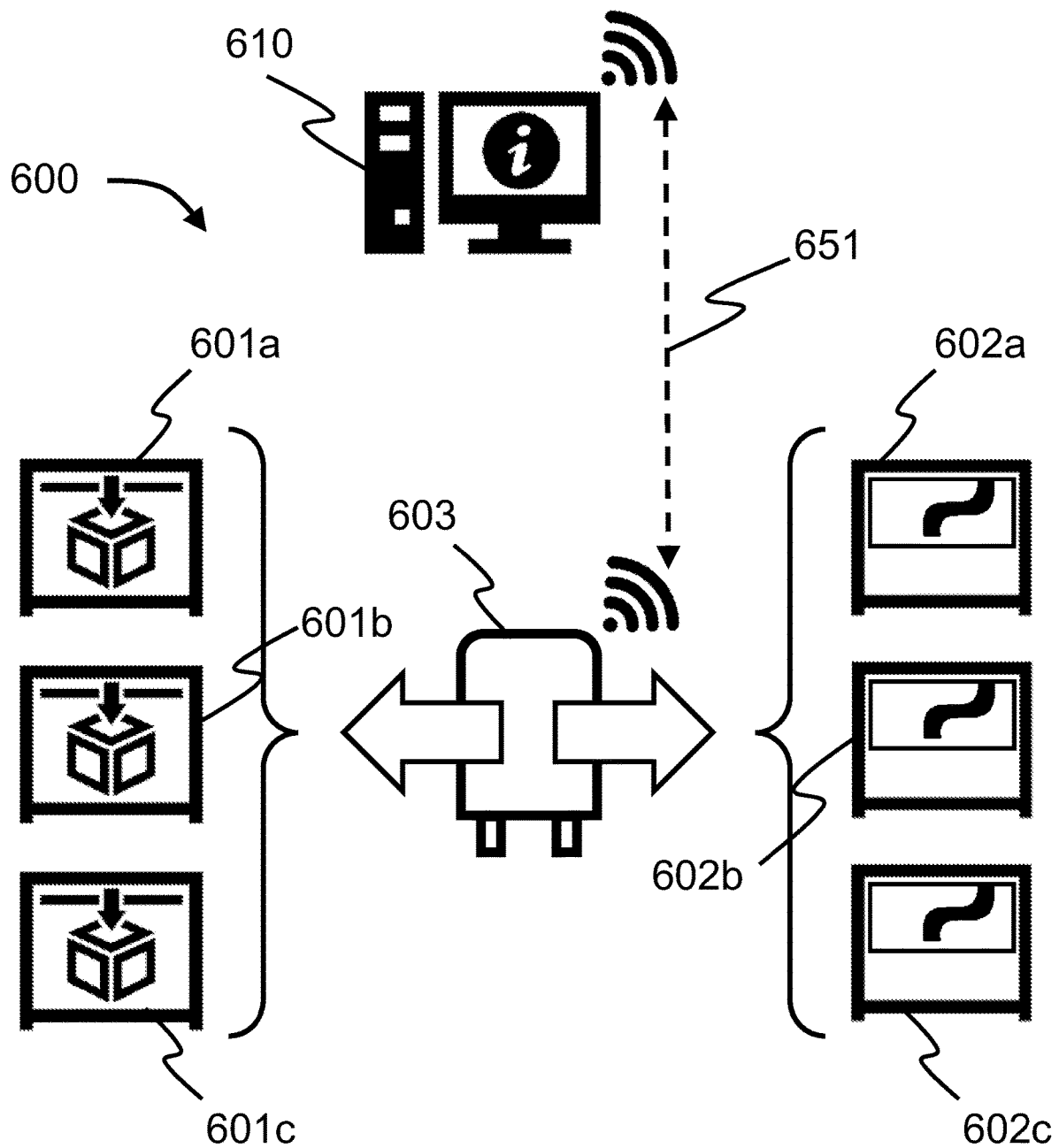
FIG. 6 shows another expanded example view of the 3D print system in FIG. 4 and an instructing user terminal.

FIG. 6 shows a 3D print system 600 comprising multiple printer devices 601*a*, 601*b*, 601*c*, multiple material processing stations 602*a*, 602*b*, 602*c* and a removable unit 603 according to an example. The printer devices 601*a*, 601*b*, 601*c*, material processing stations 602*a*, 602*b*, 602*c* and removable unit 603 may correspond to those shown in FIGS. 3*a*, 3*b* and 3*c*. In the example shown, instructions for a print job are provided to the 3D print system 600 from a computer device 610 running a print application. The print application may comprise a 3D modelling application and/or a print server. In one case, the print job may be received from a server computer device running a print server, wherein the print server receives the print job from the print application.

In the example of FIG. 6, the instructions are relayed to the 3D print system 600 via a network connection 651. The network connection 651 couples the computer device 610 and the removable unit 603. For example, the network connection 651 may form part of a local area network (LAN) or wide area network (WAN). It may comprise a wired or wireless connection (e.g. an Ethernet or WiFi connection). In the example shown, the removable unit 603 comprises a wireless network interface to receive the print job instructions over the wireless network connection 651. The removable unit 603 comprises a memory 333, and optionally a controller 335. Following receipt of the print job instructions at a wireless network interface, the memory 333 may be configured to store the print job instructions. In some examples, the instructions are handled by the controller 335 of the removable unit 603.

Once the print job instructions have been received and stored in the memory 333 of the removable unit 603, the removable unit 303 may be engaged with one of the multiple material processing stations 602*a*, 602*b*, 602*c*. Since the print job instructions are stored on the removable unit 603, the option to engage the removable device 603 with one of a multitude of material processing stations 602*a*, 602*b*, 602*c* provides further benefits to the system 600. For example, if a user intends to utilise a first material processing station 602*a*, but it is already in use, then an alternative material processing station 602*b*, 603*c* may be selected by engaging the removable unit 603 with one of the available material processing stations 602*b*, 602*c* in the print system 600, rather than the first, occupied material processing station 602*a*. This engagement may be enacted by mating the coupling 332 of the removable unit 603 with a coupling 321 of the chosen material processing station 602. This may comprise coupling one or more connectors or fasteners and/or engaging a mechanical coupling mechanism to lock the removable unit 603 within the material processing station 602. In one case, the removable unit 603 comprises castors and is wheeled into position within the coupling of the material processing station 602.

Following engagement, the instructions for the print job are transferred to the material processing station 602. In certain cases, the material processing station 602 comprises a controller and memory. Following receipt of the print job from the engaged removable unit 603, the controller may be configured to store the print job within the memory so as to perform at least one pre-processing operation before manufacturing a 3D object. In one case, the material processing station 602 may be arranged to prepare, mix and load the removable unit 603 with the build materials for completing the 3D print job defined within the received print job instructions. In one case, a controller of the material processing station 602 is configured to determine an amount of build material to supply to the engaged removable unit 603 based on instructions defining the print job instructions, e.g. as stored in a memory of the material processing station 602. In this case, a material supply system of the material processing station 602 may be arranged to supply the determined amount of build material from at least one build material supply container to a compartment 331 of the engaged removable unit 603. In an additional, or alternative, case, the aforementioned controller may be configured to determine a type of build material to supply to the engaged removable unit 603 based on the instructions in the memory. In this case, the material supply system 602 may be arranged to supply the determined type of build material from at least one build material supply container containing said type to a compartment 331 of the engaged removable unit 603. In one case, the controller is configured to control mixing of build material of different types from a respective plurality of build material supply containers based on the instructions in the memory.

Once the material preparation and/or supply has been completed for the 3D print job, the removable unit 603 may be disengaged from the material processing station 602. This may comprise releasing at least one mechanical coupling and/or disconnecting any electrical couplings. The removable unit 603 may then be moved, e.g. rolled or carried, to a printer devices 601.

In FIG. 6, the removable unit 603 is subsequently engaged with a printer device 601 of the 3D print system 600. As described above for the example shown in FIG. 5, the removable unit 603 may be engaged with any one of a plurality of print devices 601*a*, 601*b*, 601*c*, and the manufacturing of the 3D object carried out as described before.

In a further example, once the printer device 601 has finished the 3D build phase, the removable unit 603 may be dis-engaged once more from the printer device 601. This may comprise releasing at least one mechanical coupling and/or disconnecting any electrical couplings. The removable unit 603 may then be moved, e.g. rolled or carried, back to one of the plurality of material processing stations 602*a*, 602*b*, 602*c* for post-processing. The removable unit 603 may engage with any available material processing station 602*a*, 602*b*, 602*c*, and importantly, not necessarily the same material processing station 602 used in the pre-processing stage. In one example, the coupling, decoupling and/or moving of the removable unit 603 to/from at least one of a material processing station 602*a*, 602*b*, 602*c* and print device 601*a*, 601*b*, 601*c* may be fully automated.

Figure 7:
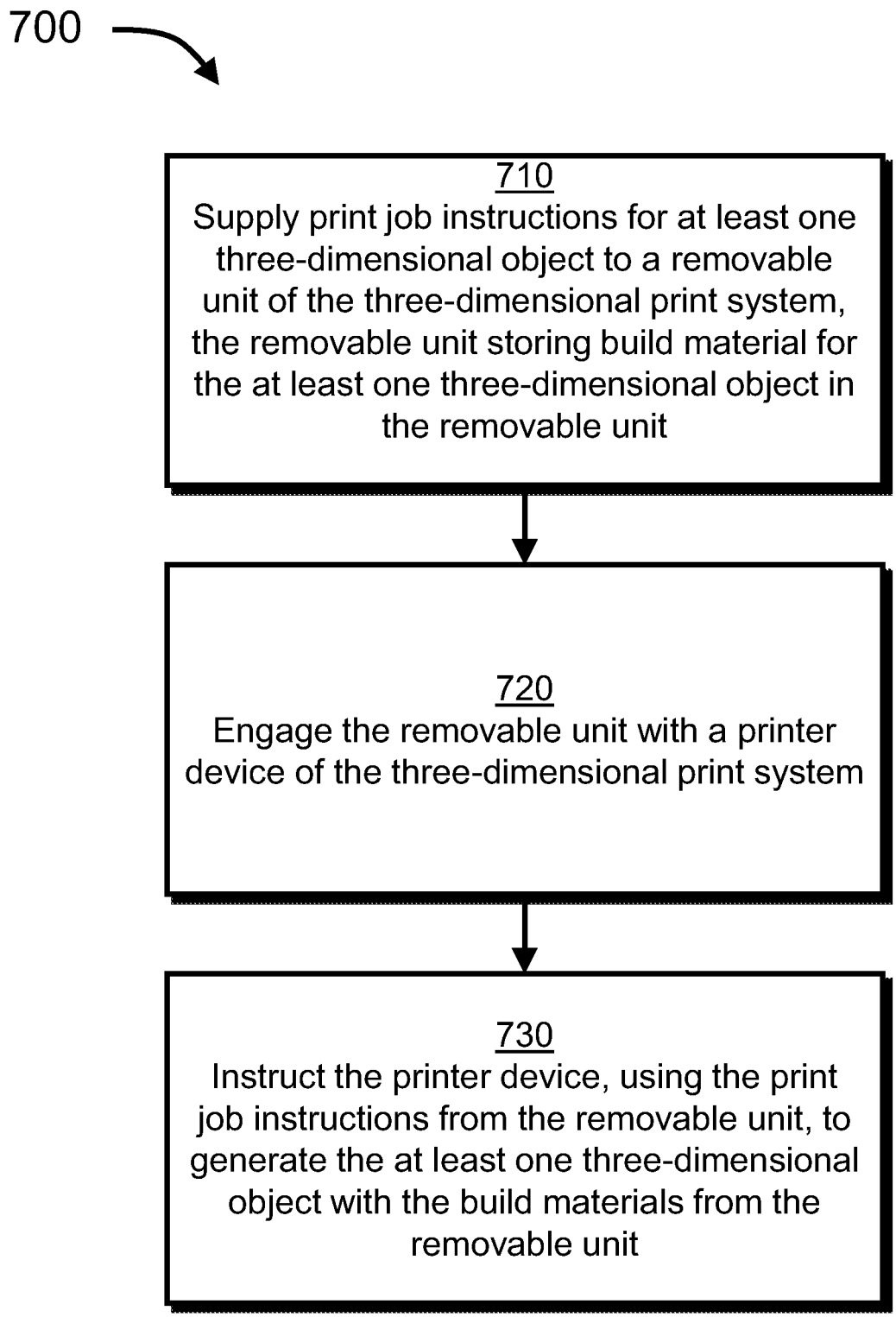
FIG. 7 shows a flow chart of an example method of 3D printing.

FIG. 7 shows a flowchart of an example method 700 of instructing a 3D print system. In a first block 710, the method comprises supplying print job instructions for at least one three-dimensional object to a removable unit of a three-dimensional print system, wherein the removable unit stores build material for the at least one three-dimensional object.

In a second block 720, the removable unit is engaged with a printer device of the three-dimensional print system.

In a third block 730, the printer device is instructed, using the print job instructions provided by the removable unit, to generate the at least one three-dimensional object with the build materials from the removable unit.

In a further example of the method outlined above, prior to supplying the print job instructions to the removable unit, the removable unit is engaged with a material processing station, and the removable unit is loaded with the build materials for the at least one 3D object.

In a further example, supplying the 3D print job instructions to the removable unit comprises engaging the removable unit with a material processing station, and communicating the print job instructions from the material processing station to a memory of the removable unit.

In a further example of the method, prior to relaying the print job instructions to the removable unit, the print job instructions are sent from a print application to the material processing station.

In a further example method, supplying print job instructions to the removable unit comprises transmitting the print job instructions to the removable unit using a wireless communications channel.

Figure 8:
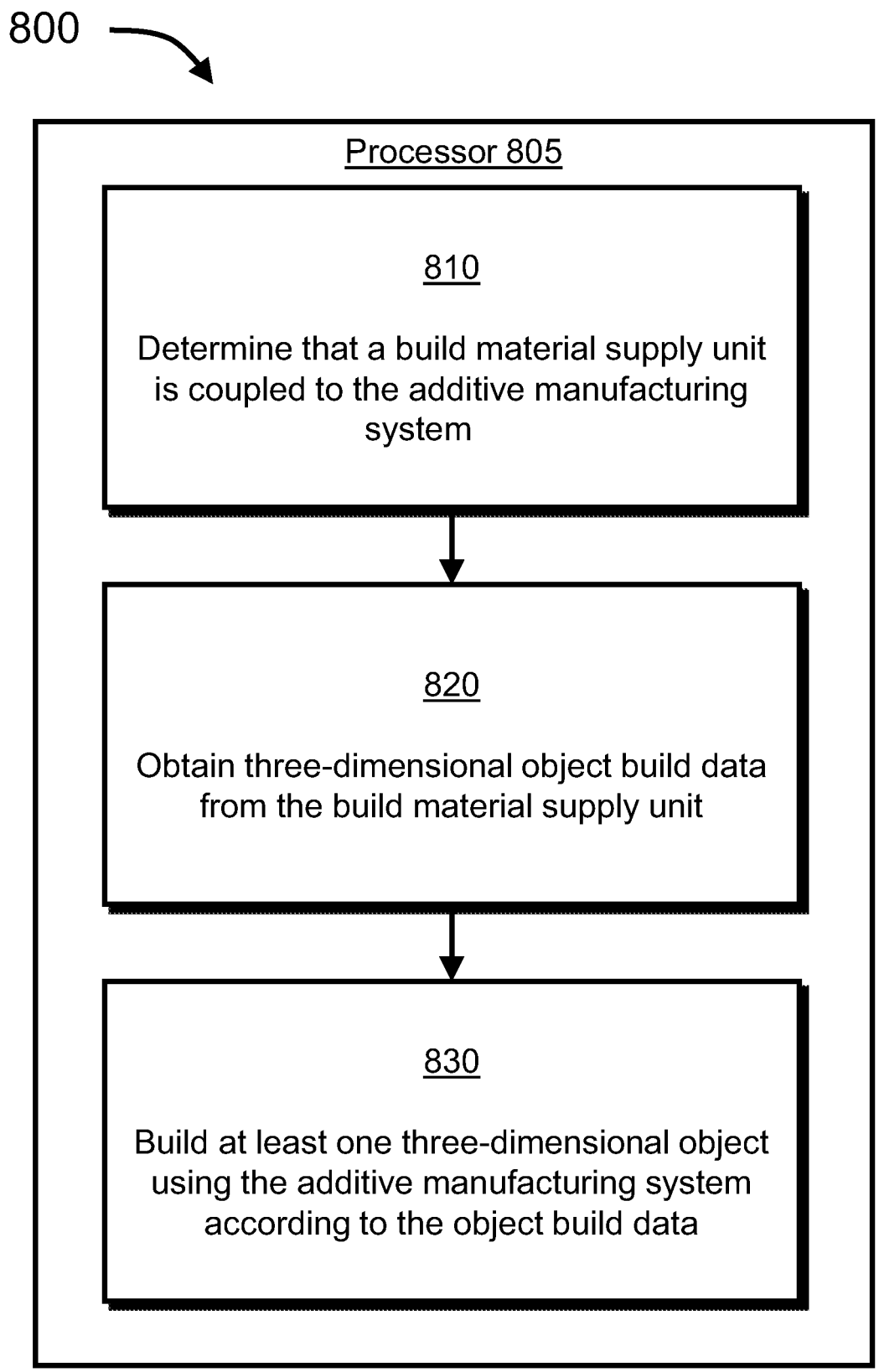
FIG. 8 shows a schematic view of an example non-transitory computer-readable storage medium.

FIG. 8 shows a non-transitory computer-readable storage medium 800 comprising a set of computer-readable instructions 810, 820, 830. There is also provided a processor 800 of an additive manufacturing system configured to carry out the stored instructions. When the instructions 810, 820, 830 are executed by the processor 800, they cause the processor to: determine that a build material supply unit is coupled to the additive manufacturing system (block 810); obtain three-dimensional object build data from the build material supply unit (block 820); and build at least one three-dimensional object using the additive manufacturing system according to the object build data (block 830).

The above examples enable more flexible and efficient device usage in high-productivity 3d printing environments. This includes quicker recovery in the case of a single device failure, and more efficient job queuing.

The above examples are to be understood as illustrative only, and further examples are envisaged. For example, the data transfer interface incorporated by any of the printer device 301, material processing station 302 or removable unit 303 may be configured to transfer data by any suitable protocol, for example wireless, Bluetooth®, wired, radio, infra read, USB, near field communication, etc.

In a further example, only the initial print instruction receiving device (i.e. the material processing station 302 or the removable unit 303 as per the examples described above) are connected to a network. In this example the remaining devices in the 3D print system are "dumb", i.e. not connected to the network. In a comparative example, all elements of the 3D print system are connected to a network.

In a further example, individual 3D print jobs may be tracked by a user at a user terminal through a print application, or another device monitoring application. In an example where the print instructions are initially submitted to a material processing station, the application may have visibility of each network-connected device in the 3D printing environment and a unique ID of the 3D print job to be tracked. A query may be forwarded to each known device on the network searching for a specific job, and the progress of the given 3D print job can be reported back to the user terminal accordingly. Alternately, in another example, the various network-connected devices in the 3D print system may use an active eventing model whereby any event related to a specific 3D print job is published and all subscribers to job events receive notifications. In an example where the print instructions are initially provided to the removable unit of a 3D print system, if the removable unit is always network-connected, e.g. via a wireless network connection, each 3D print job may be easily tracked, since the submitting application may be provided with information regarding the removable unit that receives the instructions, and the corresponding 3D printer devices and material processing stations that the removable unit engages with. In this example, the application does not need to scan all of the network material processing stations and 3D printer devices in order to locate and get information about jobs in progress.

In another example, the 3D print system may comprise a plurality of 3D printer devices 101, removable units 103 and material processing stations 102. A removable unit 103 may engage with any available 3D printer device, and any available material processing station, not necessarily the same material processing station in the pre-processing stage as in the post-processing stage.

The 3D print system described above may employ any "pre-load" powder bed fusion (additive manufacturing) method, including, but not limited to: powder bed and inkjet 3D printing; electron beam additive manufacturing; direct metal laser sintering (DMLS); selective heat sintering (SHS); selective laser sintering (SLS); and selective laser melting.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

The invention claimed is:

1. A removable unit for a three-dimensional printing system that includes a three-dimensional printer device and a material processing station, the removable unit comprising:
   a compartment configured to store a build material to be used by the system during processing of a three-dimensional print job;
   a coupling configured to engage with the three-dimensional printer device and with the material processing station; and
   a memory storing instructions for the three-dimensional print job for the three-dimensional printer device to manufacture a 3D print object, the instructions including an amount of the build material to be used by the three-dimensional printer device to manufacture the 3D print object, a dimension of the 3D print object, and/or firing information for a printing agent deposition mechanism of the three-dimensional printer device.

2. The removable unit of claim 1, wherein the coupling comprises:
   a first coupling configured to engage with the three-dimensional printer device; and
   a second coupling configured to engage with the material processing station.

3. The removable unit of claim 1, wherein the memory is configured to, when the coupling is engaged with the material processing station, receive the instructions from the material processing station.

4. The removable unit of claim 1, wherein:
   the instructions stored on the memory are readable by the material processing station when the coupling is engaged with the material processing station; and/or
   the instructions stored on the memory are readable by the three-dimensional printer device when the coupling is engaged with the three-dimensional printer device.

5. The removable unit of claim 1, comprising a wireless network interface configured to receive the instructions from a print application.

6. A removable unit for a three-dimensional printing system that includes a three-dimensional printer device and a material processing station, the removable unit comprising:
   a compartment configured to store a build material to be used by the system during processing of a three-dimensional print job;
   a coupling configured to engage with the three-dimensional printer device and with the material processing station; and
   a memory configured to, when the coupling is engaged with the material processing station, receive and store instructions from the material processing station for the three-dimensional printer device to manufacture a 3D print object.

7. The removable unit of claim 6, wherein the coupling comprises a mechanical coupling and a data transfer interface comprising an electrical coupling that is integrated with the mechanical coupling.

8. The removable unit of claim 6, wherein the instructions include an amount of the build material to be used by the three-dimensional printer device to manufacture the 3D print object.

9. The removable unit of claim 6, wherein the instructions include a dimension of the 3D print object.

10. The removable unit of claim 6, wherein the instructions include firing information for a printing agent deposition mechanism of the three-dimensional printer device to manufacture the 3D print object.

11. A removable unit for a three-dimensional printing system that includes a three-dimensional printer device and a material processing station, the removable unit comprising:
    a compartment configured to store a build material to be used by the system during processing of a three-dimensional print job;
    a coupling configured to engage with the three-dimensional printer device and with the material processing station;
    a memory configured to, when the coupling is engaged with the material processing station, receive and store instructions from the material processing station for the three-dimensional printer device to manufacture a 3D print object; and
    the memory storing the instructions including an amount of the build material to be used by the three-dimensional printer device to manufacture the 3D print object, a dimension of the 3D print object, and/or firing information for a printing agent deposition mechanism of the three-dimensional printer device.

12. The removable unit of claim 11, wherein the coupling comprises:
    a first coupling configured to engage with the three-dimensional printer device; and
    a second coupling configured to engage with the material processing station.

13. The removable unit of claim 11, wherein the instructions stored on the memory are readable by the three-dimensional printer device when the coupling is engaged with the three-dimensional printer device.

14. The removable unit of claim 11, wherein the instructions include an amount of the build material to be used by the three-dimensional printer device to manufacture the 3D print object.

15. The removable unit of claim 11, wherein the instructions include a dimension of the 3D print object.

16. The removable unit of claim 11, wherein the instructions include firing information for a printing agent deposition mechanism of the three-dimensional printer device to manufacture the 3D print object.

\* \* \* \* \*